United States Patent [19]

Hoeschele et al.

[11] Patent Number: 4,769,273
[45] Date of Patent: Sep. 6, 1988

[54] BICOMPONENT MOISTURE BARRIER POLY(ETHERIMIDE) ESTER FILMS

[75] Inventors: Guenther K. Hoeschele; George J. Ostapchenko, both of Wilmington, Del.

[73] Assignee: E. I. Du Pont de Nemours and Company, Wilmington, Del.

[21] Appl. No.: 137,976

[22] Filed: Dec. 28, 1987

[51] Int. Cl.$^4$ .................. B32B 7/02; B32B 27/08; B32B 27/36
[52] U.S. Cl. .................. 428/215; 428/262; 428/473.5; 428/480; 428/913
[58] Field of Search .............. 428/480, 473.5, 913, 428/212, 245, 262, 213, 215; 525/33; 528/296, 289, 272

[56] References Cited

U.S. PATENT DOCUMENTS

| | | | |
|---|---|---|---|
| 4,493,870 | 1/1985 | Vrouenraets et al. | 428/245 |
| 4,556,688 | 12/1985 | McCready et al. | 525/33 |
| 4,556,705 | 12/1985 | McCready | 528/296 X |
| 4,636,442 | 1/1987 | Beavers et al. | 428/480 |
| 4,714,754 | 12/1987 | McCready et al. | 528/296 X |
| 4,725,481 | 2/1988 | Ostapchenko | 428/213 |

Primary Examiner—Thomas J. Herbert

[57] ABSTRACT

A bicomponent film of a hydrophilic copolyester having a WVTR of at least 3500 gm.mil/m$^2$/24 hrs. of a poly(etherimide) ester elastomer containing about 25–60 weight percent ethylene oxide units, and a hydrophobic copolyester having a WVTR of 400–2500 gm.mil/m$^2$/24 hrs. of a poly(etherimide) ester elastomer or a segmented copolyester elastomer having no more than about 20 weight percent ethylene oxide units in the hydrophobic elastomers, the bicomponent film having a separation ratio for water vapor of at least 1.2 as determined by ASTM/E 96-66 (Procedure BW).

17 Claims, No Drawings

BICOMPONENT MOISTURE BARRIER POLY(ETHERIMIDE) ESTER FILMS

BACKGROUND OF THE INVENTION

The present invention is directed to a bicomponent structure for use as surgical drape and in waterproof apparel and equipment.

The textile industry has manufactured so-called breathable fabrics composed of a film of a polymeric material that is permeable to water vapor bonded to a textile material. The most notable and successful material that transmits water vapor therethrough is a film of microporous polytetrafluoroethylene that is adhered to a textile material. Although this product has been outstandingly successful, it is rather expensive and the pores tend to be blocked by dirt, body oils and detergents. Also, there is a need for a waterproof film having good physical properties, low cost and offering long service life. It is known that other polymers can be formed into films that have high water-vapor transmission rates and when covered with textile materials, such as nylon or poly(ethylene terephthalate), can be used to make waterproof and water vapor permeable garments. U.S. Pat. No. 4,493,870 discloses waterproof garments made of a textile material that is covered with a single layered film of a copolyetherester made from a dicarboxylic acid, an aliphatic diol and a poly(alkylene oxide) glycol wherein at least 70% of the glycol has a carbon to oxygen ratio 2.0-2.4. Such waterproof garments described therein have water vapor transmission rate values that do not depend on the film surface facing its high humidity side. The values obtained are equal when either side is exposed to the same level of humidity. Accordingly, there is a need for breathable waterproof, water vapor permeable products that transmit water vapor at a slower rate from the environment exterior to the protective product than from the interior. For example, shoes or boots fabricated with such a product having the ability to transfer moisture at a higher rate from within, to assure comfort, would keep the wearer's feet drier for a longer period of time under exterior soaking conditions than the products disclosed in U.S. Pat. No. 4,493,870. Up to the time of the present invention, the water vapor transmission rates of the water vapor permeable layers of commercially available products, e.g., raincoats, were substantially the same in either direction. Japanese Patent Application No. 50-35623, published Oct. 1, 1976, discloses a water vapor permeable product of a single layered film of a copolyetherester elastomer covered with a textile material. The teaching in the Japanese patent application suffers the same deficiencies as those found in U.S. Pat. No. 4,493,870, e.g., the water vapor permeable product transmits water vapor at the same rate from either side of the sheet or film when exposed to the same level of humidity. The present invention describes an easily processible, low cost waterproof, water vapor permeable film for use as surgical drape and in waterproof articles, e.g., garments, having maximum benefit of rapid transmission of water-vapor through the film toward the exterior, or weather side of the garment, while minimizing the transmission of water in the opposite direction, making the garment more comfortable to wear due to the increase in the water vapor transmission rate away from the wearer while protecting the wearer from water, liquid and vapor, from exterior sources.

SUMMARY OF THE INVENTION

The present invention is directed to a bicomponent film of a hydrophilic copolyester elastomer layer and a hydrophobic copolyester elastomer layer bonded together to permit differential transfer of water vapor through the film to prevent buildup of water vapor on the hydrophilic side comprising:

(A) a continuous layer of a hydrophilic copolyester elastomer 0.3-6 mil thick and having a water vapor transmission rate of at least 3500 gm.mil/m$^2$/24 hrs. according to ASTM E96-66 (Procedure BW), said hydrophilic elastomer is a poly(etherimide) ester comprising the reaction product of one or more diols, one or more dicarboxylic acids, and one or more poly(oxyalkylene imide) diacids, said poly(oxyalkylene imide) diacid containing sufficient repeating units of ethylene oxide so that the resulting poly(etherimide) ester contains about 25-60 weight percent ethylene oxide units;

(B) a continuous layer of a hydrophobic copolyester elastomer 0.05-6 mil thick and having a water vapor transmission rate of 400-2500 gm.mil/m$^2$/24 hrs. according to ASTM E96-66(Procedure BW) said hydrophobic elastomer is a copolyester selected from the group consisting of (i) a poly(etherimide) ester, as described hereinabove in (A), with the proviso that the poly(etherimide) ester contains no more than about 20 weight percent ethylene oxide units, and (ii) a segmented copolyester having a multiplicity of recurring long chain ester units and short chain ester units joined head-to-tail through ester linkages, said long chain ester units being represented by the formula

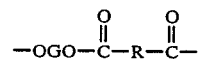

and said short chain ester units being represented by the formula

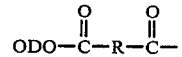

where G is a divalent radical remaining after the removal of terminal hydroxyl groups from a poly(alkylene oxide)glycol having an average molecular weight of about 400-3500, and the amount of ethylene oxide units incorporated in the segmented copolyester by the poly(alkylene oxide) glycol is not greater than about 20 weight percent based upon the weight of the copolyester; R is a divalent radical remaining after the removal of carboxyl groups from a dicarboxylic acid having a molecular weight less than 300; D is a divalent radical remaining after removal of hydroxyl groups from a diol having a molecular weight less than about 250; said hydrophobic segmented copolyester has from about 25-80 weight percent short chain ester units; and, said bicomponent film of hydrophilic and hydrophobic layers has a separation ratio for water vapor of at least 1.2 as determined by ASTM E96-66 (Procedure BW).

By content of ethylene oxide repeating units in the poly(etherimide) ester elastomer and copolyetherester elastomer is meant the weight percent in the elastomers of repeating units of($CH_2$-$CH_2$-O-) that are derived from the poly(oxyalkylene imide) diacid or poly(alkylene oxide) glycol, respectively.

The separation ratio for water vapor means the value of the water vapor transmission rate measured with the hydrophilic layer of the bicomponent film next to the water surface divided by the value of the water vapor transmission rate of the bicomponent film with the hydrophobic layer next to the water surface, as described in ASTM E96-66 (Procedure BW), conducted at 22° C. The presence of fabric on the bicomponent film has no effect on the value of the separation ratio of the bicomponent film.

The bicomponent film is especially useful as surgical drape which is used to cover areas of a patient's body where surgery is being performed to reduce the possibility of bacterial infection. Also, the bicomponent film is especially adapted to be attached to a textile fabric, both woven and nonwoven, through the hydrophobic layer to make breathable, water vapor permeable articles such as raincoats, jackets, tents, wet suits, protective apparel, gloves, shoes, boots, car covers, etc.

The bicomponent film of the present invention has a much higher water vapor transmission rate (WTVR), as measured by ASTM E96-66 (Procedure BW), when water vapor passes in the direction of the hydrophilic layer of film and then through the hydrophobic layer of the film of the bicomponent film, as contrasted to the passage of water vapor from the hydrophobic layer of film and then through the hydrophilic layer of film. When the bicomponent film of this invention is used as surgical drape and the hydrophilic layer of film is placed next to the patient's skin, accumulation of water vapor under the surgical drape next to the wound or on the pateint's skin is reduced due to the higher rate of water vapor transmission from the hydrophilic layer through the hydrophobic layer. The nonporosity of the bicomponent film lessens the probability of infection caused by contamination of the area. In addition, the higher rate of water vapor transmission of the hydrophilic layer is useful when the bicomponent film is used in apparel, such as raincoats, jackets and shoe lining. For example, when the bicomponent film of the present invention is used for making raincoats and a textile material is attached, by melt bonding or by adhesive bonding, to the hydrophobic layer of the film, the water vapor transmission rate is substantially higher for water vapor passing in the direction of the hydrophilic layer of the film to and through the hydrophobic layer of the film rather than in the other direction.

Consequently, the wearer of the raincoat enjoys more comfort because water vapor accumulating on the inside of the coat next to the hydrophilic layer of the bicomponent film is less than that amount that would accumulate if the WVTR was about the same in each direction.

DESCRIPTION OF PREFERRED EMBODIMENTS

The poly(etherimide) esters elastomers used in the present invention for the hydrophilic layer are prepared by conventional processes from (a) one or more diols, (b) one or more dicarboxylic acids and (c) one or more poly(oxyalkylene imide) diacids. Preferred poly(etherimide) esters can be prepared when the diol (a) is one or more $C_2$-$C_{15}$ aliphatic and/or cycloaliphatic diols, when the dicarboxylic acid (b) is one or more $C_4$-$C_{16}$ aliphatic, cycloaliphatic and/or aromatic dicarboxylic acids or ester derivatives thereof and when the poly(oxyalkylene imide) diacid (c) is derived from one or more polyoxyalkylene diamines and one or more tricarboxylic acid compounds containing two vicinal carboxyl groups or an anhydride group and an additional carboxyl group. The poly(oxyalkylene imide) diacids must contain sufficient repeating units of ethylene oxide so that the resulting poly(etherimide) ester elastomer contains from 25 to 60, preferably 30–55, weight percent ethylene oxide units. In general, the weight ratio of poly(oxyalkylene imide) diacid (c) to dicarboxylic acid (b) is from about 0.5 to 4.0, preferably from about 0.8 to about 3.0.

Suitable diols (a) for use in preparing the poly(etherimide) ester elastomers include saturated and unsaturated aliphatic and cycloaliphatic dihydroxy compounds as well as aromatic dihydroxy compounds. These diols, preferably, have low molecular weights, i.e. having a molecular weight of about 250 or less. When used herein, the term "diols" and "low molecular weight diols" should be construed to include equivalent ester forming derivatives thereof, provided, however, that the molecular weight requirement pertains to the diol only and not to its derivatives. Exemplary ester forming derivatives are the acetates of the diols as well as, for example, ethylene oxide or ethylene carbonate for ethylene glycol.

Preferred saturated and unsaturated aliphatic and cycloaliphatic diols are those having from about 2 to 15 carbon atoms. Representative diols include ethylene glycol, 1,3-propanediol, 1,4-butanediol, 1,5-pentanediol, 2-methylpropanediol, 2,2-dimethyl propanediol, 1,6-hexanediol, 1,10-decanediol, 1,2-,1,3- and 1,4-dihydroxy cyclohexane; 1,2-, 1,3- and 1,4-cyclohexane dimethanol; 1,4-butenediol mixed with major amounts of 1,4-butanediol. 1,4-butanediol is especially preferred.

Aromatic diols used are generally those having from 6 to 15 carbon atoms. Included among the aromatic dihydroxy compounds are resorcinol; hydroquinone; 1,5-dihydroxynapthalene; 4,4'-dihydroxydiphenyl; bis(p-hydroxyphenyl)methane and bis(p-hydroxyphenyl)-propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred compositions are those in which 1,4-butanediol is present in a predominant amount, most preferably when 1,4-butanediol is the only diol used.

Dicarboxylic acids (b) which are used to make the poly(etherimide) ester elastomers are aliphatic, cycloaliphatic, and/or aromatic dicarboxylic acids. Preferably, these acids have low molecular weight, i.e., having a molecular weight of less than about 300; however, higher molecular weight dicarboxylic acids, especially dimer acids, may be used. The term "dicarboxylic acids" as used herein, includes equivalents of dicarboxylic acids having two functional groups which perform substantially like dicarboxylic acids in reaction with glycols and diols in forming polyester polymers. These equivalents include esters and ester-forming derivatives, such as acid halides and anhydrides. The molecular weight preference, mentioned above, pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300.

Aliphatic dicarboxylic acids, as the term is used herein, refers to carboxylic acids having two carboxyl groups each of which is attached to a saturated carbon atom. If the carbon atom to which the carboxyl group is attached is in a ring, the acid is cycloaliphatic.

Representative aliphatic and cycloaliphatic acids which can be used are sebacic acid, 1,2-cyclohexanedicarboxylic acid, 1,3-cyclohexanedicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2-dicarboxylic acid, 2-ethylsuberic acid, cyclopentanedicarboxylic acid, decahydro-1,5-naphthalenedicarboxylic acid, 4,4'-bicyclohexyldicarboxylic acid, decahydro-2,6-naphthalenedicarboxylic acid, 4,4-methylenebis(cyclohexanecarboxylic acid), 3,4-furandicarboxylic acid. Preferred aliphatic acids are cyclohexane dicarboxylic acids, sebacic acid, glutaric acid, azelaic acid and adipic acid.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals such as —O— or —SO$_2$—.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxbenzoic acid), 1,5-naphthalenedicarboxylic acid, 2,6-naphthalenedicarboxylic acid, 2,7-naphthalenedicarboxylic acid, phenanthrene dicarboxylic acid, anthracenedicarboxylic acid, 4,4'-sulfonyldibenzoic acid, and halo and $C_1$-$C_{12}$ alkyl, alkoxy, and aryl ring substitution derivatives thereof. Hydroxy acids such as p($\beta$-hydroxyethoxy) benzoic acid can also be used provided an aromatic dicarboxylic acid is also present.

Preferred dicarboxylic acids for the preparation of the poly(etherimide) ester elastomers are the aromatic dicarboxylic acids, mixtures thereof and mixtures of one or more dicarboxylic acid with an aliphatic and/or cycloaliphatic dicarboxylic acid, and most preferably, only aromatic dicarboxylic acids are used. Among the aromatic dicarboxylic acids, those with 8-16 carbon atoms are preferred, most preferably, the benzenedicarboxylic acids, i.e., phthalic, terephthalic and isophthalic acids and their dimethyl derivatives. Especially preferred is dimethyl terephthalate.

Finally, where mixtures of dicarboxylic acids are employed, it is preferred that at least about 60 mole %, preferably at least about 80 mole %, based on 100 mole % of dicarboxylic acid (b) be the same dicarboxylic acid or ester derivative thereof. As mentioned above, the preferred compositions are those in which dimethyl terephthalate is the predominant dicarboxylic acid, most preferably when dimethyl terephthalate is the only dicarboxylic acid.

Poly(oxyalkylene imide) diacids (c) suitable for use herein are high molecular weight imide diacids wherein the number average molecular weight is greater than about 900, most preferably greater than about 1200. They may be prepared by the imidization reaction of one or more tricarboxylic acid compounds containing two vicinal carboxyl groups or an anhydride group and an additional carboxyl group which must be esterifiable and preferably is nonimidizable with a high molecular weight polyoxylalkylene diamine. The high molecular weight polyoxyalkylene diamines used to prepare the poly(oxyalkylene imide) diacids generally have the formula $H_2N$—G—$NH_2$ where G is a divalent radical remaining after removal of hydroxyl groups of a long chain ether glycol having a molecular weight of from about 600-6000, usually 900-4000. The polyalkylene diamines are those usually having 2-5 carbon atoms in the alkylene group. Representative polyoxyalkylene diamines include polyoxyethylene diamine, polyoxypropylene diamine, polyoxybutylene diamine and the like.

A special class of poly(oxyalkylene imide) diacids is prepared by imidization of a high molecular weight poly(oxyalkylene) diamine with one or more tricarboxylic acid compounds containing two vicinal carboxyl groups or an anhydride group and an additional carboxyl group in the presence of pyromellitic anhydride. The number of equivalents of anhydride or vicinal carboxylic acid functions provided by the tricarboxylic acid compounds and pyromellitic anhydride should be the same as the total number of amine functions. Generally, the molar ratio of pyromellitic anhydride to the tricarboxylic acid compounds containing two vicinal carboxylic acid groups or an anhydride group and an acid group ranges from 0.33 to 1.5. This modification with pyromellitic anhydride increases the molecular weight of the poly(oxyalkylene imide) diacids and increases the hydrophilic nature of the resulting poly(etherimide) ester elastomer.

In general, preferred poly(oxyalkylene imide) diacids useful herein can be characterized by the following formula

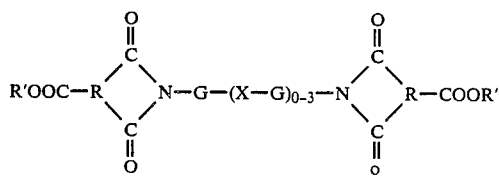

wherein each R is independently a trivalent organic radical, preferably a $C_2$ to $C_{20}$ aliphatic aromatic or cycloaliphatic trivalent organic radical; each R' is independently hydrogen or a monovalent aliphatic or cycloaliphatic radical containing 1-6 carbon atoms or an aromatic radical containing 6-12 carbon atoms, e.g., benzyl, most preferably R' is hydrogen; and G is the radical remaining after the removal of the terminal (or as nearly terminal as possible) hydroxy groups of a long chain alkylene ether glycol having an average molecular weight of from about 600 to about 6000, and X is as follows

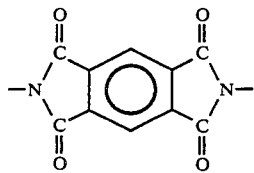

Representative long chain ether glycols from which the polyoxylkylene diamine is prepared include poly(ethylene ether) gylcol alone or in combination with other long chain ether glycols provided that the long chain glycols are selected so that the resulting poly(etherimide) ester elastomer contains about 25 weight percent to about 60 weight percent units of ethylene oxide. Representative long chain ether glycols that can be used with poly(ethylene oxide) glycols include poly(propylene ether) glycol; poly(tetramethylene ether) glycol; random or block copolymers of ethylene oxide and propylene oxide. Poly(ethylene oxide) glycol used alone is especially preferred.

In general, the polyoxyalkylene diamines have an average molecular weight of from about 600 to 6000, preferably from about 900 to about 4000.

The tricarboxylic component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and, preferably, is substantially nonimidizable.

Further, while trimellitic anhydride is preferred as the tricarboxylic component, any of a number of suitable tricarboxylic acid constituents can be used including 2,6,7-naphthalenetricarboxylic anhydride; 3,3',4-diphenyltricarboxylic anhydride; 3,3',4-benzophenonetricarboxylic anhydride; 1,3,4-cyclopentane tricarboxylicanhydride; 2,2',3-diphenyl tricarboxylic anhydride; diphenyl isopropylidene 3,3',4-tricarboxylic anhydride; 3,4-dicarboxyphenyl 3+-carboxylphenyl ether anhydride; 1,3,4-cyclohexanetricarboxylic anhydride; etc. These tricarboxylic acid materials can be characterized by the following formula:

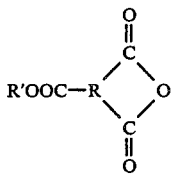

where R is a trivalent organic radical, preferably a $C_2$ to $C_{20}$ aliphatic, aromatic, or cycloaliphatic trivalent organic radical and R' is preferably hydrogen or a monovalent organic radical preferably a $C_1$ to $C_6$ aliphatic and/or cycloaliphatic radical and $C_6$ to $C_{12}$ aromatic radicals, e.g. benzyl; most preferably hydrogen. As mentioned above a portion of the tricarboxylic acid component can be replaced by pyromellitic anhydride.

Briefly, the poly(oxyalkylene imide) diacids may be prepared by known imidization reactions including melt synthesis or by synthesizing in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture.

For preparation of the poly(etherimide)ester elastomers, it is preferred that the diol be present in at least a molar equivalent amount, preferably a molar excess, most preferably 150 mole % based on the moles of dicarboxylic acid (b) and poly(oxyalkylene imide) diacid (c) combined. Such molar excess of diol will have a beneficial effect on the polymerization kinetics and ensure complete reaction of the acid components.

The weight ratios of poly(oxyalkylene imide) diacid (c) to dicarboxylic acid (b) is a necessary condition to maintain to form the poly(etherimide) ester elastomers. Compositions used in this invention are those in which the weight ratio of the poly(oxyalkylene imide) diacid (c) to dicarboxylic acid (b) is from about 0.5 to about 4.0, preferably from about 0.8 to about 3. The poly(etherimide) ester elastomers usually comprise the reaction product of dimethyl terephthalate, optimally with up to 40 mole % of another dicarboxylic acid; 1,4-butanediol, optionally with up to 40 mole % of another saturated or unsaturated aliphatic and/or cycloaliphatic diol; and a poly(oxyethylene imide) diacid prepared from a polyoxyalkylene diamine of molecular weight of from about 600 to about 6000, preferably from about 900 to about 4000, and trimellitic acid, optionally in the presence of pyromellitic anhydride.

The poly(etherimide) ester elastomers and process for their preparation are well known and more fully described in U.S. Pat. Nos. 4,556,705 and 4,556,688, the disclosures of which are incorporated by reference.

It is customery and preferred to utilize a catalyst in the process for the production of the poly(etherimide) ester elastomers. In general, any of the known esterinterchange and polycondensation catalysts may be used. Where the reactants and reactions allow, it is preferred to use the titanium catalysts including the inorganic and organic titanium containing catalysts.

The poly(etherimide) ester elastomers used to make the vapor permeable, waterproof film must contain at least about 25 weight percent repeating units of ethylene oxide and usually not more than about 60 percent by weight ethylene oxide units, preferably for a balance of desirable physical properties and water vapor transmission rate the poly(etherimide) ester elastomers contain 30–55 weight percent ethylene oxide units. The presence of repeating units of ethylene oxide causes the polymer to be permeable to water vapor. The higher the percentage of repeating units of ethylene oxide in the polymer, the higher the degree of water vapor permeability.

The poly(etherimide) ester elastomer film can vary in thickness. However, usually the film is from about 0.3–6 mil thick, depending on the use contemplated. For use in tents the film is usually not greater than about 6 mil and when it is used in raincoats and jackets it is usually at least about 0.3 mil thick. The water vapor transmission rate for the hydrophilic film is at least about 3500 gm.mil/m²/24 hours according to ASTM E96-66 (Procedure BW), preferably 3500–20,000 gm.mil/m²/24 hours.

The copolyester used to make the hydrophobic layer is 0.05–6 mil thick and has a water vapor transmission rate 400–2500 gm.mil/m²/24 hrs. according to ASTM E96-66 (Procedure BW). The copolyester used to make the hydrophobic layer can be a poly(etherimide) ester elastomer as described above, with the proviso that the poly(etherimide) ester contains no more than about 20 weight percent ethylene oxide units. Usually, for the preparation of the hydrophobic layer the poly(oxyalkylene imide) diacid used to make the poly(etherimide) ester does not contain any ethylene oxide units and, consequently, the resulting copolyester does not contain any ethylene oxide units. However, if a poly(oxyethylene imide) diacid is used for the preparation of the poly(etherimide) ester hydrophobic layer no more than about 20 weight percent ethylene oxide units can be present in the imide diacid resulting, of course, in a poly(etherimide) ester containing no more than 20 weight percent ethylene oxide units.

Although the poly(etherimide) ester elastomer possess many desirable properties, it is preferred to stabilize the compositions against heat, oxidation, radiation by UV light and the like. This can be accomplished by incorporating stabilizer materials into the compositions either during production or while in a hot melt stage following polymerization. The particular stabilizers useful herein are any of those known in the art which are suitable for poly(etherimide) esters.

Alternatively, the copolyester used to make the hydrophobic layer can be a segmented copolyester elastomer having a multiplicity of recurring long-chain ester units and short-chain ester units joined head-to-tail through ester linkages, said long-chain ester units being represented by the formula

(I)

and said short-chain ester units being represented by the formula:

(II)

where G is a divalent radical remaining after the removal of terminal hydroxyl groups from a poly(alkylene oxide)glycol having an average molecular weight of about 400-3500, and further, the amount of ethylene oxide units incorporated in the copolyester by the poly(alkylene oxide)glycol is not greater than about 20 weight percent based upon the total weight of the copolyester; R is a divalent radical remaining after removal of carboxyl groups from a dicarboxylic acid having a molecular weight less than 300; and D is a divalent radical remaining after removal of hydroxyl groups from a diol having a molecular weight less than about 250; and said hydrophobic copolyester has from about 25-80 weight percent short-chain ester units.

The poly(alkylene oxide)glycol used to make the hydrophobic segmented copolyester elastomer can contain ethylene oxide units provided that the elastomer contains less than about 20 weight percent ethylene oxide units based on the total weight of the polymer. In many instances, the poly(alkylene oxide)glycol used to make the copolyester does not contain any ethylene oxide units and, of course, the resulting copolyester does not contain repeating units of ethylene oxide. However, poly(alkylene oxide)glycols that contain ethylene oxide units in amounts that result in a copolyester having no more than about 20 weight percent ethylene oxide units, preferably, not greater than about 15 weight percent, based on the elastomer, can be used because the resulting copolyesters have a sufficiently low degree of water vapor permeability, i.e., not greater than about 2500 gm,mil/m²/24 hrs. Representative poly(alkylene oxide)glycols that can be used to form the long-chain ester units of the hydrophobic copolyester have molecular weights from 400-3500, usually 600-1500, and include poly(1,2-and 1,3-propylene oxide)glycol, poly(tetramethylene oxide)glycol, random or block copolymers of ethylene oxide and 1,2-propylene oxide of the proper proportions and random or block copolymers of tetrahydrofuran with minor amounts of a second monomer such as methyltetrahydrofuran used in proportions such that the ethylene oxide content will result in a segmented copolyester having no more than about 20 weight percent ethylene oxide units. Preferably, the poly(alkylene oxide)glycols used to make the hydrophobic film are poly(tetramethylene ether)glycol or ethylene-oxide capped (polypropylene oxide) glycol.

The term "short-chain ester units" as applied to units in a polymer chain of the segmented copolyesters forming the hydrophobic layer of the bicomponent film refers to low molecular weight compounds or polymer chain units having molecular weights less than about 550. They are made by reacting a low molecular weight diol or a mixture of diols (MW below about 250) with a dicarboxylic acid to form ester units represented by Formula (II) above.

Preferably, the melting point of the segmented copolyester of the hydrophobic elastomers is greater than 120° C., usually from about 120° C. to above about 220° C. If the melting point of the copolyester is less than about 120° C., then the polymer is tacky and difficult to handle in film form; and if the melting point is more than about 220° C., then the films become excessively stiff. The melting points are determined by differential scanning calorimeter (DSC).

Included among the low molecular weight diols which react to form short-chain ester units suitable for use for preparing segmented copolyesters forming the hydrophobic layer of the bicomponent film are acyclic, alicyclic and aromatic dihydroxy compounds as described above for the preparation of the poly(etherimide) esters. Preferred compounds are diols with 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, most especially 1,4-butanediol. Included among the bisphenols which can be used are bis(p-hydroxy)diphenyl, bis(p-hydroxyphenyl) methane, and bis(p-hydroxyphenyl)propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol and not to its derivatives.

Dicarboxylic acids which are reacted with the foregoing long-chain glycols and low molecular weight diols to produce the segmented copolyesters used in this invention for the hydrophobic layer of the bicomponent films are aliphatic, cycloaliphatic or aromatic dicarboxylic acids of a low molecular weight, i.e., having a molecular weight of less than about 300, as described above for the poly(etherimide) ester elastomers. The term "dicarboxylic acids" as used herein, includes acid equivalents of dicarboxylic acids having two functional carboxyl groups which perform substantially like dicarboxylic acids in reaction with glycols and diols in forming copolyetherester polymers. These equivalents include esters and ester-forming derivatives, such as acid halides and anhydrides. The molecular weight requirement pertains to the acid and not to its equivalent ester or ester-forming derivative.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used are sebacic acid, 1,3-cyclohexane dicarboxylic acid, 1,4-cyclohexane dicarboxylic acid, adipic acid, glutaric acid, 4-cyclohexane-1,2-dicarboxylic acid, 2-ethylsuberic acid, cyclopentanedicarboxylic acid, decahrdro-1,5-naphthylene dicarboxylic acid, 4,4,'-bicyclohexyl dicarboxylic acid, decahydro-2,6-naphthylene dicarboxylic acid, 4,4'-methylenebis(cyclohexyl) carboxylic acid,3,4-furan dicarboxylic acid. Preferred acids are cyclohexane-dicarboxylic acids and adipic acid.

Representative aromatic dicarboxylic acids which can be used to make the segmented copolyesters used to form films include phthalic, terephthalic and isophthalic acids, bibenzoic acid, substituted dicarboxy compounds with two benzene nuclei such as bis(p-carboxyphenyl)methane, p-oxy-1,5-naphthalene dicarboxylic acid, 2,6-naphthalene dicarboxylic acid, 2,7-naphthalene dicarboxylic acid, 4,4'-sulfonyl dibenzoic acid and $C_1$-$C_{12}$ alkyl and ring substitution derivatives thereof, such as halo, alkoxy, and aryl derivatives. Hydroxyl acids such as p-(beta-hydroxyethoxy)benzoic acid can also be used providing an aromatic dicarboxylic acid is also present.

Aromatic dicarboxylic acids are a preferred class for preparing the segmented copolyester polymers useful for making the bicomponent films of this invention. Among the aromatic acids, those with 8-16 carbon atoms are preferred, particularly terephthalic acid alone or with a mixture of phthalic and/or isophthalic acids. At least about 70% of the groups represented by R in Formulae (I) and (II) above describing the copolyester are 1,4-phenylene radicals and at least about 70% of the groups represented by D in Formula (II) above are 1,4-butylene radicals and the sum of the percentages of R groups which are not 1,4-phenylene radicals and D groups which are not 1,4-butylene radicals do not exceed 30%. If a second decarboxylic acid is used to make the copolyester, isophthalic acid is the acid of choice and if a second low molecular weight diol is used, 1,4-butenediol or hexamethylene glycol are the diols of choice.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol. The segmented copolyester elastomers used to make the hydrophobic layer of the bicomponent film described herein can be made conveniently by a conventional ester interchange reaction. A preferred procedure involves heating the ester of an aromatic acid, e.g., dimethyl ester of terephthalic acid, with the poly(alkylene oxide)glycol and a molar excess of the low molecular weight diol, 1,4-butanediol, in the presence of a catalyst at 150°-260° C., followed by distilling off methanol formed by the interchange reaction. Heating is continued until methanol evolution is complete. Depending on temperature, catalyst and glycol excess, this polymerization is complete within a few minutes to a few hours. This product results in the preparation of a low molecular weight prepolymer which can be carried to a high molecular weight copolyester by the procedure described below. Such prepolymers can also be prepared by a number of alternate esterification or ester interchange processes; for example, the long-chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long-chain glycol.

The resulting prepolymer is then carried to high molecular weight by distillation of the excess of short-chain diol. This process is known as "polycondensation". Additional ester interchange occurs during this distillation to increase the molecular weight and to randomize the arrangement of the copolyester units. Best results are usually obtained if this final distillation or polycondensation is run at less than 1 mm. pressure and 240°-260° C. for less than 2 hours in the presence of antioxidants such as 1,6-bis-[3,5-di-tert-butyl-4-hydroxyphenol)propionamido]-hexane or 1,3,5-trimethyl-2,4,6-trist[3,5-ditertiary-butyl-4-hydroxybenzyl]benzene.

Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titantes, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol, are conveniently removed during polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation.

Various conventional fillers can be added to the segmented copolyesters usually in amount of from about 1–10 percent by weight of the copolyester that form layers of the bicomponent film. Fillers such as clay, talc, alumina, carbon black, silica can be used, the latter being preferred, and white and light colored pigments can be added to the polymers. In general, these additives have the effect of increasing the modulus at various elongations.

Any suitable textile material used for the manufacture of rainwear, jackets, protective clothing, tents and the like can be attached, preferably by melt bonding or adhesive bonding, to the poly(etherimide) ester film or to the hydrophobic layer of the bicomponent film. The hydrophobic layer is an essential part of the bicomponent film. The hydrophobic layer substantially covers one surface of the hydrophilic layer forming the bicomponent film. The hydrophobic layer functions as a means of contolling the WVTR separation ratio and facilitates adhesive bonding to textile materials as compared to the bond of a single layer film of hydrophilic material. Also, when the polymer forming the hydrophobic layer has a sufficiently lower melting point than the poly(etherimide) ester elastomer forming the hydrophilic layer (at least about 10° C. less), it can function as an adhesive for bonding textile material, woven or nonwoven, to it while the higher melting hydrophilic layer is unsoftened and maintains the integrity of the bicomponent film to form a flexible layered product that can be fabricated into wearing apparel, etc. In addition, for bicomponent films the hydrophobic layer of film that is coextruded with the hydrophilic layer of film results in a strong bond between the layers because of the chemical similarity of the elastomers forming the bicomponent film. Usually, the textile materials used are polyethylene terephthalate, or polyamides such as nylon 6, or nylon 66, cotton, cellulose triacetate, etc. The textile materials are attached to or bonded to the hydrophilic poly(etherimide) ester elastomer or to the hydrophobic layer of the bicomponent film to make a layered product. Usually conventional materials, such as fluorocarbons and silicones, are coated or sprayed on the textile material to render it more water-repellant.

The composite structure of the hydrophobic layer of the bicomponent film and the hydrophilic poly(etherimide) ester elastomer layer of the film results in a much higher WVTR for the passage of water vapor through, first, the hydophilic layer and then through the hydrophobic layer, than the passage of water vapor through, first, the hydrophobic layer and then through the hydrophilic layer when the water vapor source is next to the hydrophobic layer. Garments made from the bicomponent film have the hydrophilic layer on the inside next to the wearer and, therefore, since the WVTR is higher in the direction from the hydrophilic layer through the hydrophobic layer, it has a beneficial cooling effect on the wearer of the garment. Such garments keep out snow and rain without keeping in perspiration.

The hydrophobic and hydrophilic layers forming the bicomponent films of the present invention behave like a permeability valve. The permeability of the bicomponent film structure is not linear with vapor pressure (relative humidity). As the relative humidity is increased, the hydrophilic layer absorbs water in an amount determined by its composition which causes it to swell and become more permeable. When the hydrophilic layer of the bicomponent film is next to the water source, the value of the water vapor transmission rate is about two to three times higher than when the hydrophobic layer is next to the water source. The bicomponent film of the hydrophobic elastomer and the hydrophilic poly(etherimide) ester elastomer is made by a conventional coextrusion procedure. The chemical similarities in structure and composition and melt viscosity behavior of the elastomers result in uniform layers of the bicomponent film with excellent adhesion between layers.

Briefly, the process for making the bicomponent film by coextrusion is as follows. The poly(etherimide) ester elastomer and additives, if any, forming the hydrophilic layer of the bicomponent film is fed to one extruder and the poly(etherimide) ester or copolyester and additives, if any, forming the hydrophobic layer is fed to a second extruder. The polymers in the extruders are heated above their melting points, which should differ by at least about 10° C. when a textile material is to be melt bonded to the hydrophobic layer, and each layer is passed to a conventional melt combining block connected to the extruders where the extruded layers are contacted one on top of the other. The layers then pass through a flat die connected to the combining block where the coextruded layers adhere to each other and form a bicomponent film structure. The bicomponent film coming out of the die is melt coated on a support substrate, such as lightweight polyester film, release paper, etc., and the bicomponent film is wound and stored for use. The bicomponent film can be used, for example, as surgical drape.

If it is desired to make a bicomponent film into material for fabrication into a raincoat, jacket or other garment, or tent, etc., the bicomponent film is bonded to a textile material, such as poly(ethylene terephthalate), by thermal lamination of the bicomponent film on hot roll calendering equipment with the hydrophobic layer of the film next to the textile material. Briefly, one such procedure is as follows. The temperature used to bond the textile material to the hydrophobic layer of the bicomponent film is sufficient to melt the hydrophobic layer, but not the hydrophilic layer, and with the application of sufficient pressure, the layers are bonded. The resulting flexible layered product can be made into wearing apparel, tents, etc.

The following examples are illustrative of the invention in which parts and percentages are by weight unless otherwise indicated.

Ingredients Used

Poly(etherimide) ester A contained 40 weight percent 1,4-butylene terephthalate and 60 weight percent 1,4-butylene poly(oxyalkylene diimide) diacid ester. The diimide diacid was prepared by the imidization of trimellitic anhydride with Texaco Chemical Company's Jeffamine ED-2001, a predominately ethylene oxide containing, copoly(ethylene oxide-propylene oxide)

diamine, number average molecular weight 2000. The poly(etherimide) ester had a calculated ethylene oxide unit content of 44.4 weight percent.

Poly(etherimide) ester B contained 34 weight percent 1,4-butylene terephthalete, 6 weight percent 1,4-butylene isophthalate and 60 weight percent poly(oxyalkylene diimide) diacid ester. The diimide diacid was prepared by the imidization of trimellitic anhydride with Texaco Chemical Company's Jeffamine ED-2001, a predominantly ethylene oxide containing copoly(ethylene oxide-propylene oxide) diamine, number average molecular weight 2000. The poly(etherimide) ester had a calculated ethylene oxide unit content of 44.4 weight percent.

Poly(etherimide) ester C contained 40.5 weight percent 1,4-butylene terephthalate, 13.3 weight percent 1,4-butylene isophthalate and 46.2 weight percent 1,4-butylene poly(oxyalkylene diimide) diacid. The diimide diacid was prepared by the imidization of trimellitic anhydride with Texaco Chemical Company's Jeffamine ED-2000, a polypropylene ether diamine, average molecular weight 2000. The poly(etherimide) ester had a calculated ethylene oxide unit content of 0 weight percent.

Copolyester D contained 20.3 weight percent 1,4-butylene terephthalate, 7.9 weight percent 1,4-butylene isophthalate, 51.7 weight percent poly(tetramethylene ether) isophthalate wherein the poly(tetramethylene ether) glycol used had a molecular weight of 2000. The ethylene oxide unit content of the polymer was zero.

The poly(etherimide) ester and copolyesters listed below in Table 1 were extruded into film form on a film extrusion line which consisted of a 28 mm diameter Werner Pfleiderer twin screw extruder, a 10 inch wide die having a 0.01 inch gap, a quench roll and wind-up roll. The extruder and die were heated to about 10 to 15 degrees C. above the polymer melting point and the polymer was extruded through the die using a screw speed of 100 rpm. The molten polymer film exiting the die was draw down to the final film thickness by controlling the quench drum speed. The quench drum temperature was maintained at 60 degrees C.

TABLE 1

| Ingredient | EO, % | Thickness, mils | WVTR* |
|---|---|---|---|
| A | 46.0 | 1.0 | 18900 |
| B | 46.0 | 1.4 | 20000 |
| C | 0 | 0.7 | 470 |

*gms/m$^2$-24 hrs. (ASTM E96-66 BW)

The data in Table 1 show the water vapor transmission rate of single films prepared from poly(etherimide) esters.

EXAMPLES 1-2

Poly(etherimide) ester C, which will form the hydrophobic layer of the film, was dissolved in methylene chloride to give a 10 percent by weight solution. Hydrophilic films of poly(etherimide) esters A and B were solution coated on one side with hydrophobic polymer C in solution, resulting in Examples 1 and 2, respectively. After solvent evaporation of hydrophobic polymer C, the resulting bicomponent film consisted of two layers wherein the hydrophobic layer of poly(etherimide) ester C was approximately 10% of the total bicomponent film thickness. The WVTR values of the bicomponent films were then measured according to ASTM E96-66 (Procedure BW) with the hydrophobic layer next to the water and with the hydrophilic layer next to the water. The results are given in Table 2.

TABLE 2

| Example | WVTR(I) | WVTR(D) | Separation Ratio WVTR(I)/WVTR(D) |
|---|---|---|---|
| 1(A&C) | 5440 | 2610 | 2.3 |
| 2(B&C) | 4580 | 1820 | 2.5 |

WVTR = gm · m$^2$/24 hrs.
WVTR(I) = hydrophilic side facing water
WVTR(D) = hydrophobic side facing water Examples 1-2 show that hydrophilic poly(etherimide) esters A and B coated with hydrophobic poly(etherimide) ester C can be used to produce a water vapor permeable breathable bicomponent film wherein the WVTR with the hydrophilic side of the film facing the water is substantially higher than when the hydrophobic side of the film is facing the water.

EXAMPLES 3-4

Films of examples 1 and 2 were heat laminated to non-woven polyester fabric (Examples 3 and 4, respectively) at 160° C. and the WVTR values were determined with the hydrophobic layer next to the water and, also, with the hydrophilic layer next to the water. The results are given in Table 3.

TABLE 3

| Example | WVTR(I) | WVTR(D) | Separation Ratio WVTR(I)/WVTR(D) |
|---|---|---|---|
| 3 | 3160 | 1370 | 2.3 |
| 4 | 4150 | 1260 | 3.3 |

EXAMPLES 5-6

Segmented copolyester D, a hydrophobic polymer, was dissolved in methylene chloride to give a 10 percent by weight solution. The hydrophilic films identified above as Ingredient A and Ingredient B were solution coated on one side with the hydrophobic polymer solution D, resulting in examples 5 and 6, respectively. After solvent evaporation, the resulting bicomponent film consisted of two layers wherein the hydrophobic copolyester layer D was approximately 10% of the total bicomponent film thickness. The WVTR values of the bicomponent films were then measured according to ASTM E96-66 (Procedure BW) with the hydrophobic layer next to the water, WVTR (D), and with the hydrophilic layer next to the water WVTR(I). The results are given in Table 4.

TABLE 4

| Example | WVTR(I) | WVTR(D) | Separation Ratio WVTR(I)/WVTR(D) |
|---|---|---|---|
| 5(D&A) | 8340 | 4200 | 2.0 |
| 6(D&B) | 6530 | 2500 | 2.6 |

The results of Table 4 show that a hydrophobic segmented copolyester elastomer can be used in combination with a hydrophilic poly(ethermide) ester elastomer to produce bicomponent films in which the WVTR is greater in one direction than another resulting in a separation ratio greater than 1.2.

We claim:

1. A bicomponent film of a hydrophilic copolyester elastomer layer and a hydrophobic copolyester elastomer layer bonded together to permit differential transfer of water vapor and prevent buildup of moisture comprising:

(A) a continuous layer of a hydrophilic copolyester elastomer 0.3-6 mil thick and having a water vapor transmission rate of at least 3500 gm.mil/m²/24 hrs according to ASTM E-96-66 (Procedure BW), said hydrophilic elastomer is a poly(etherimide) ester comprising the reaction product of one or more diols, one or more dicarboxylic acids, and one or more poly(oxyalkylene imide) diacids, said poly(oxyalkylene imide) diacid containing sufficient repeating units of ethylene oxide such that the resulting poly(etherimide) ester contains about 25-60 weight percent ethylene oxide units;

(B) a continuous layer of a hydrophobic copolyester elastomer 0.05-6 mil thick and having a water vapor transmission rate of 400-2500 gm.mil/m²/24 hrs. according to ASTM E96-66 (Procedure BW) said hydrophobic elastomer is a copolyester selected from the group consisting of
(i) a poly(etherimide) ester, as described hereinabove in (A), with the proviso that the poly(etherimide) ester elastomer contains no more than about 20 weight percent ethylene oxide units, and
(ii) a segmented copolyester having a multiplicity of recurring long chain ester units and short chain ester units joined head-to-tail through ester linkages, said long chain ester units being represented by the formula

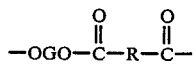

and said short chain ester units being represented by the formula

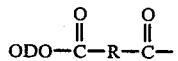

where G is a divalent radical remaining after the removal of terminal hydroxyl groups from a poly(alkylene oxide) glycol having an average molecular weight of about 400-3500, and the amount of ethylene oxide units incorporated in the segmented copolyester by the poly(alkylene oxide)glycol is not greater than about 20 weight percent based upon the weight of the copolyester; R is a divalent radical remaining after the removal of carboxyl groups from a dicarboxylic acid having a molecular weight less than about 300; D is a divalent radical remaining after removal of hydroxyl groups from a diol having a molecular weight less than about 250; said hydrophobic segmented copolyester has from about 25-80 weight percent short chain ester units; and,
said bicomponent film of hydrophilic and hydrophobic layers has a separation ratio for water vapor of at least 1.2 as determined by ASTM E96-66 (Procedure BW).

2. A bicomponent film of claim 1 wherein the poly(oxyalkylene imide)diacid of the hydrophilic layer has the formula

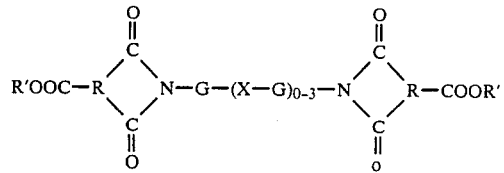

wherein each R is independently a trivalent organic radical, R' is independently hydrogen or a monovalent aliphatic or cycloaliphatic radical containing 1-6 carbon atoms or an aromatic radical containing 6-12 carbon atoms, G is a radical remaining after the removal of the terminal hydroxy groups of a long chain alkylene ether glycol having an average molecular weight of from about 600-6000, and X has the formula

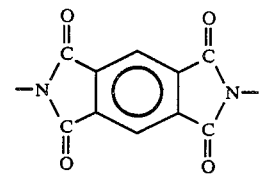

said poly(oxyalkylene imide) contains sufficient repeating units of ethylene oxide so that the resulting poly(etherimide) ester elastomer contains about 25-60 weight percent ethylene oxide units and said film has a water vapor transmission rate of at least 3500 gm.mil/m²/24 hrs. according to ASTM E96-66 (Procedure BW).

3. A bicomponent film of claim 1 wherein the diol for the hydrophilic copolyester elastomer (A) 1,4-butanediol.

4. A bicomponent film of claim 1 wherein the dicarboxylic acid ester for the hydrophilic copolyester elastomer (A) is dimethyl terephthalate.

5. A bicomponent film of claim 1 wherein the poly(oxyalkylene imide) diacid for the hydrophilic copolyester elastomer (A) is poly(oxyethylene imide) diacid.

6. A bicomponent film of claim 1 wherein the separation ratio is at least about 1.4.

7. A bicomponent film of claim 1 wherein the poly(oxyalkylene imide) diacid for the hydrophilic copolyester elastomer (A) is derived from a polyoxyalkylene diamine and trimellitic anhydride.

8. A bicomponent film of claim 1 wherein the poly(oxyalkylene imide) diacid is derived from a polyoxyalkylene diamine and a mixture of trimellitic anhydride and pyromellitic anhydride.

9. A bicomponent film of claim 1 wherein the hydrophobic layer is substantially free of ethylene oxide units.

10. A bicomponent film of claim 1 wherein the hydrophilic poly(etherimide) ester elastomer (A) contains 30-55 weight percent ethylene oxide units.

11. A bicomponent film of claim 1 wherein the hydrophobic layer is covered with a textile material.

12. A bicomponent film of claim 2 wherein the hydrophobic layer is covered with a textile material.

13. A bicomponent film of claim 3 wherein the hydrophobic layer is covered with a textile material.

14. A bicomponent film of claim 4 wherein the hydrophobic layer is covered with a textile material.

15. A bicomponent film of claim 5 wherein the hydrophobic layer is covered with a textile material.

16. A bicomponent film of claim 6 wherein the hydrophobic layer is covered with a textile material.

17. A bicomponent film of claim 7 wherein the hydrophobic layer is covered with a textile material.

* * * * *